United States Patent
Hoffman et al.

(10) Patent No.: US 9,804,692 B2
(45) Date of Patent: Oct. 31, 2017

(54) SYSTEM AND METHOD FOR GENERATING HAPTIC FEEDBACK IN STYLUS

(71) Applicant: SAMSUNG DISPLAY CO., LTD., Yongin, Gyeonggi-Do (KR)

(72) Inventors: David M. Hoffman, Fremont, CA (US); Wei Xiong, Mountain View, CA (US)

(73) Assignee: Samsung Display Co., Ltd., Yongin-si (KR)

(*) Notice: Subject to any disclaimer, the term of this patent is extended or adjusted under 35 U.S.C. 154(b) by 101 days.

(21) Appl. No.: 14/659,532

(22) Filed: Mar. 16, 2015

(65) Prior Publication Data
US 2015/0277596 A1    Oct. 1, 2015

Related U.S. Application Data

(60) Provisional application No. 61/972,196, filed on Mar. 28, 2014.

(51) Int. Cl.
| | |
|---|---|
| *G06F 3/0354* | (2013.01) |
| *G06F 3/0488* | (2013.01) |
| *G06F 3/01* | (2006.01) |

(52) U.S. Cl.
CPC ......... *G06F 3/03546* (2013.01); *G06F 3/016* (2013.01); *G06F 3/0488* (2013.01); *G06F 3/03545* (2013.01)

(58) Field of Classification Search
None
See application file for complete search history.

(56) References Cited

U.S. PATENT DOCUMENTS

| | | | | |
|---|---|---|---|---|
| 7,265,750 | B2 * | 9/2007 | Rosenberg | A63F 13/06 178/18.04 |
| 8,681,130 | B2 | 3/2014 | Adhikari | |
| 9,116,560 | B1 * | 8/2015 | Habash | G06F 3/016 |
| 2001/0028345 | A1 * | 10/2001 | Natsuyama | G06F 3/03545 345/179 |
| 2002/0097223 | A1 * | 7/2002 | Rosenberg | A63F 13/06 345/157 |
| 2003/0146286 | A1 * | 8/2003 | Berson | G06K 19/06018 235/487 |
| 2009/0135149 | A1 * | 5/2009 | Taniuchi | G06F 3/04845 345/173 |

(Continued)

FOREIGN PATENT DOCUMENTS

| | | |
|---|---|---|
| CN | 101770301 A | 7/2010 |
| KR | 10-2003-0028946 A | 4/2003 |

(Continued)

OTHER PUBLICATIONS

EPO Search Report dated Aug. 10, 2015, for corresponding European Patent application 15160747.0, (6 pages).

(Continued)

*Primary Examiner* — Seokyun Moon
(74) *Attorney, Agent, or Firm* — Lewis Roca Rothgerber Christie LLP

(57) ABSTRACT

In a stylus for a display device, the stylus includes: a bearing housing; a roller in the bearing housing; and a first actuator coupled to the bearing housing and configured to apply a pressure against the roller to modulate a friction between the stylus and the roller.

18 Claims, 8 Drawing Sheets

(56) References Cited

U.S. PATENT DOCUMENTS

| | | | |
|---|---|---|---|
| 2011/0267318 A1 | 11/2011 | Knee | |
| 2012/0293463 A1* | 11/2012 | Adhikari | G06F 3/03546 345/179 |
| 2012/0293464 A1 | 11/2012 | Adhikari | |
| 2013/0106771 A1 | 5/2013 | Bakken et al. | |
| 2014/0022217 A1 | 1/2014 | Wenger | |
| 2014/0043242 A1* | 2/2014 | Dietz | G06F 3/016 345/173 |

FOREIGN PATENT DOCUMENTS

| | | |
|---|---|---|
| KR | 10-2006-0104315 A | 10/2006 |
| KR | 10-2012-0045272 A | 5/2012 |

OTHER PUBLICATIONS

KR Patent Registration No. 10-1200030; dated Nov. 12, 2012 corresponds to KR Publication No. 10-2012-0045272 A above (11 sheets).

Internet Site; Static and Kinetic Coefficient of Friction Reference Table for COF Values of Common Materials; Address: http:/blog.mechguru.com/machine-design/typical-coefficient-of-friction-values-for-common-materials/; downloaded Mar. 16, 2015; pp. 1-8.

Internet Site; Material Hardness Tables, Ted Pella, Inc.; Address: http:www.tedpella.com/company_html/hardness.htm; downloaded Mar. 16, 2015; pp. 1-3.

\* cited by examiner

SYSTEM AND METHOD FOR GENERATING HAPTIC FEEDBACK IN STYLUS

CROSS-REFERENCE TO RELATED APPLICATION

The present application claims priority to and the benefit of U.S. Provisional Patent Application Ser. No. 61/972,186, entitled "METHOD AND APPARATUS FOR GENERATING HAPTIC FEEDBACK IN A STYLUS IN CONTACT WITH A DISPLAY," filed in the United States Patent and Trademark Office on Mar. 28, 2014, the entire content of which is incorporated herein by reference.

BACKGROUND

Modern computing systems may include a user interface that allows a user to use simulated drawing tools that are analogous to real-world physical tools. For example, a software application may operate in conjunction with a display device to display a user interface with drawing tools for simulating the graphical effects of writing with a variety of real-world writing instruments on real-world substrates or textures, such as a pencil writing on paper, or a paintbrush painting on a canvas.

Many computer systems may even incorporate the functionality of a stylus to achieve a more familiar writing interface than, for example, using a computer mouse. The act of writing on a touch sensor using a stylus, however, does not effectively simulate the experience of using real-world writing instruments to write or draw on real world textured substrates. A stylus being used in conjunction with a touch sensor interface (e.g., a touchscreen display), however, provides an unrealistic tactile sensation to the user when various writing instruments or writing surfaces are simulated. This is because a stylus used with a touch sensor interface typically provides a uniform tactile feedback to the user regardless of the texture of the virtual writing surface or the type of virtual writing instrument.

The above information disclosed in this Background section is only for enhancement of understanding of the background of the invention and therefore it may contain information that does not form prior art.

SUMMARY

Aspects of embodiments of the present invention include a system and method for generating haptic feedback in a stylus.

According to some embodiments of the present invention, in a stylus for a display device, the stylus includes: a bearing housing; a roller in the bearing housing; and a first actuator coupled to the bearing housing and configured to apply a pressure against the roller to modulate a friction between the stylus and the roller.

The stylus may further include a second actuator coupled to the bearing housing and may be configured to apply a pressure against the roller to modulate the friction between the stylus and the roller.

The first actuator may be configured to apply the pressure against the roller by moving a friction modulator against the roller.

The pressure may be applied according to a data from the display device.

The stylus may further include a strain gauge configured to measure a force applied to the stylus, and the first actuator may be configured to modulate the friction between the stylus and the roller according to the force.

The stylus may further include an axial actuator coupled to the bearing housing and may be configured to adjust an axial position of the bearing housing in the stylus.

According to some embodiments of the present invention, a haptic feedback system includes: a display; and a stylus in communication with the display, wherein the stylus includes: a bearing housing; a roller in the bearing housing; and a first actuator coupled to the bearing housing and configured to apply a pressure against the roller to modulate a friction between the stylus and the roller.

The haptic feedback system may further include a second actuator coupled to the bearing housing and may be configured to apply a pressure against the roller to modulate the friction between the stylus and the roller.

The first actuator may be configured to apply the pressure against the roller by moving a friction modulator against the roller.

The bearing housing may operate as the friction modulator.

The haptic feedback system may further include a strain gauge configured to measure a force applied to the stylus, and the first actuator may be configured to modulate the friction between the stylus and the roller according to the force.

The haptic feedback system may further include an axial actuator coupled to the bearing housing and may be configured to adjust an axial position of the bearing housing in the stylus.

The haptic feedback system may further include a processor configured to transmit a data signal to the first actuator to modulate the friction based on texture data corresponding to an image displayed on the display and a motion of the stylus relative to the image.

According to some embodiments of the present invention, in a method of generating haptic feedback, the method includes: detecting a touch input on a display, the touch input being applied to a touch interface by a roller of a stylus; and modulating a friction applied to the roller according to the touch input.

The method may further include displaying an image on the display, wherein the modulating of the friction applied to the roller is based on texture data corresponding to the image.

The modulating of the friction applied to the roller may be further based on a motion of the stylus on the touch interface relative to the image displayed on the display.

The method may further include calculating an orientation of the stylus relative to the display and modulating the friction applied to the roller according to the orientation.

The modulating of the friction applied to the roller may further include applying a first pressure against the roller by a first friction actuator.

The modulating of the friction applied to the roller may include applying a second pressure against the roller by a second friction actuator.

The method may further include: displaying an image on the display; and adjusting a position of the roller within stylus by an axial actuator according to texture data corresponding to the image.

BRIEF DESCRIPTION OF THE DRAWINGS

A more complete appreciation of the present invention, and many of the attendant features and aspects thereof, will become more readily apparent as the invention becomes

DETAILED DESCRIPTION

Figure 1:
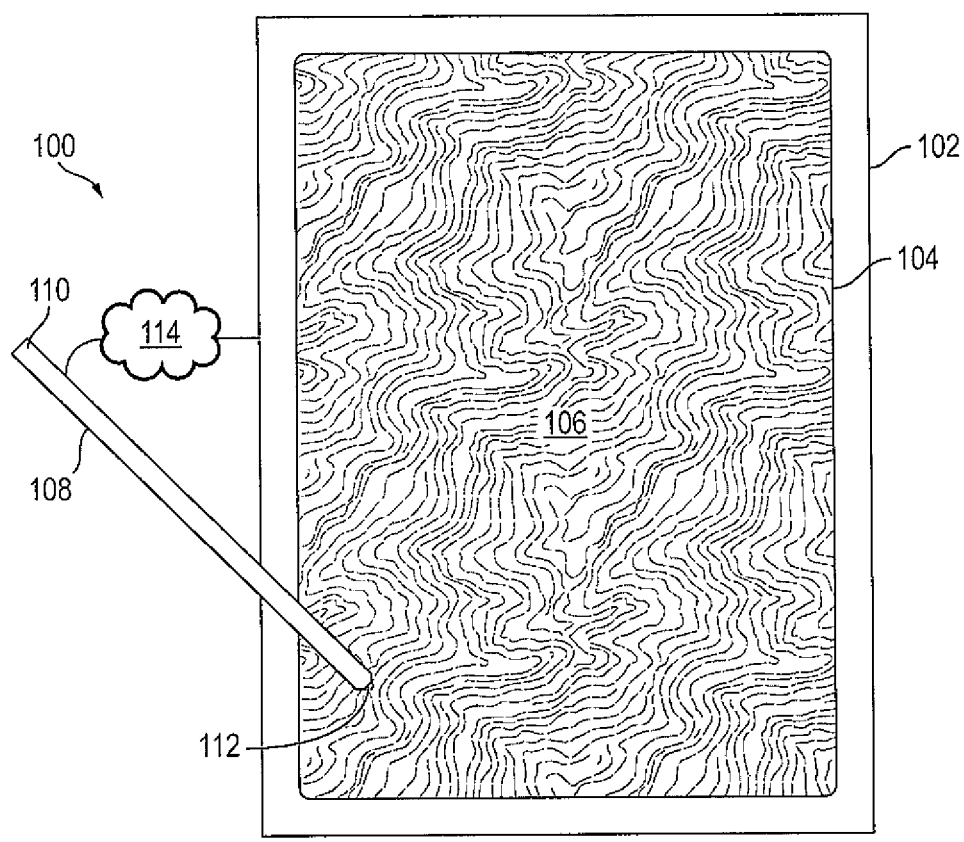
FIG. 1 illustrates an example of a haptic feedback system, according to embodiments of the present invention.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey some of the aspects and features of the present invention to those skilled in the art. Accordingly, processes, elements, and techniques that are not necessary to those having ordinary skill in the art for a complete understanding of the aspects and features of the present invention are not described with respect to some of the embodiments of the present invention. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a," and "an" are intended to include the plural forms as well, unless the context clearly indicates otherwise. It will be further understood that the terms "comprises," "comprising," "includes," and/or "including" when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the present invention refers to "one or more embodiments of the present invention." Also, the term "exemplary" is intended to refer to an example or illustration.

It will be understood that when an element or layer is referred to as being "on," "connected to," "connected with," "coupled to," or "adjacent to" another element or layer, it can be directly on, connected to, coupled to, or adjacent to the other element or layer, or one or more intervening elements or layers may be present. When an element or layer is referred to as being "directly on," "directly connected to," "directly coupled to," or "immediately adjacent to" another element or layer, there are no intervening elements or layers present.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

In recent years, touch sensor electronic devices have become commonplace as personal mobile electronic devices, such as mobile phones, tablets, laptops, and the like have increased in popularity. Along with the rise in touch sensor user interfaces for computing devices, the use of a stylus as a mechanism for providing user input in a touch sensor interface has gained in popularity. Indeed, the use of a stylus may allow for an improved user experience compared to using a finger to write or draw images or text, because the stylus may offer finer control over the touch points on the touch sensor. Additionally, a stylus more closely resembles many real-world writing instruments, such as a pencil or a pen, and users may therefore be more comfortable writing and drawing with a stylus than with their fingers.

The experience of writing or drawing with a stylus on a virtual substrate using a virtual writing instrument, however, is inferior to the feel of writing with a real-world writing instrument on a real-world surface. After all, a stylus-screen interface lacks the same texture and variety of tactile feedback and control that is experienced using real-world writing instruments and surfaces. For example, the friction level between a stylus and a touch sensor interface is typically very different than the friction level that a user would experience with the actual writing tools that are being simulated. Further, in a stylus on touch sensor interface, such friction levels typically do not vary even when the virtual writing tool and the texture of the virtual surface vary.

Embodiments of the present invention, therefore, are directed to providing a more immersive and realistic experience when simulating various writing instruments and writing surfaces using a stylus and touch sensor interface for writing and drawing applications. According to embodiments of the present invention, images displayed on a display panel may include pre-stored or pre-programmed friction data corresponding to physical friction and texture properties, such that the haptic feedback system of the present invention may adjust the friction applied to an internal roller of a stylus to emulate writing on various textures (e.g., real-world textures) using various writing instruments (e.g., real-world writing instruments).

Accordingly, embodiments of the present invention include systems and methods for providing haptic feedback in a stylus (e.g., in contact with a display surface).

FIG. 1 illustrates an example of a haptic feedback system 100, according to embodiments of the present invention. As shown in FIG. 1, the haptic feedback system 100 includes an electronic device 102. The electronic device 102 may be any suitable computer system or mobile device such as a desktop or laptop personal computer, cellular telephone, smartphone, PDA, tablet computer, or other similar electronic device capable of sophisticated data processing and electronic communication with other devices. The electronic device 102 may additionally include a touch sensor 104 for receiving input from users operating the electronic device 102. According to some embodiments, the touch sensor 104 may be incorporated into or overlapping with a display panel 106. The touch sensor 104 may include any suitable touch sensor according to the design and function of the electronic device 102 (e.g., a capacitive or resistive touch sensor, a pressure sensing sensor, etc.) such that a user may provide touch or gesture input (e.g., using a finger or stylus touch sensor interface) to interact with a graphical user interface (GUI) or images displayed by the display panel 106.

The haptic feedback system 100 further includes a stylus 108 configured to provide user input to the electronic device 102 through user interaction between the stylus 108 and the touch sensor 104 and to generate haptic feedback to the user. The stylus 108 includes a housing or body 110 for enclosing electronic and mechanical components of the stylus 108, which will be discussed in more detail below. The stylus 108 further includes a roller 112 at a tip of the housing 110 for contacting the electronic device 102.

The stylus 108 is connected to (e.g., is in electronic communication with) the electronic device 102 over a data communication interface or network 114 such as, for example, a personal area network, a local area network, or a wide area network using any suitable wireless data communication protocol. For example, the stylus 108 may be in communication with the electronic device 102 using a short range wireless communication standard such as a Bluetooth® wireless configuration. Alternatively, the stylus 108 may be connected to (e.g., in electronic communication with) the electronic device 102 with a suitable wired interface in which data is transmitted between the stylus 108 and the electronic device 102 by way of a suitable analog or digital cable interface.

Accordingly, the stylus 108 and the electronic device 102 are configured to transmit data signals between each other during the operation of the stylus 108 with the electronic device 102. For example, as will be discussed in more detail below, the stylus 108 and the electronic device 102 may exchange data signals regarding touch location and movement of the stylus 108 (and the roller 112) on the touch sensor 104, the relative orientation and pressure between the stylus 108 and the electronic device 102 and/or the touch sensor 104, and texture information of images displayed on the display panel 106. Based on the data signals exchanged between the stylus 108 and the electronic device 102, the haptic feedback system 100 may adjust the friction of the roller 112 within the stylus 108 to modulate the ease with which the roller 112 may roll within the stylus 108. Accordingly, the haptic feedback system 100 may simulate the various textures or effects of a variety of writing utensils against a variety of writing surfaces (e.g., a pencil or ballpoint pen writing on paper, a piece of chalk writing on a sidewalk, a marker writing on a whiteboard, a paintbrush painting on a canvas, etc.).

Figure 2A:
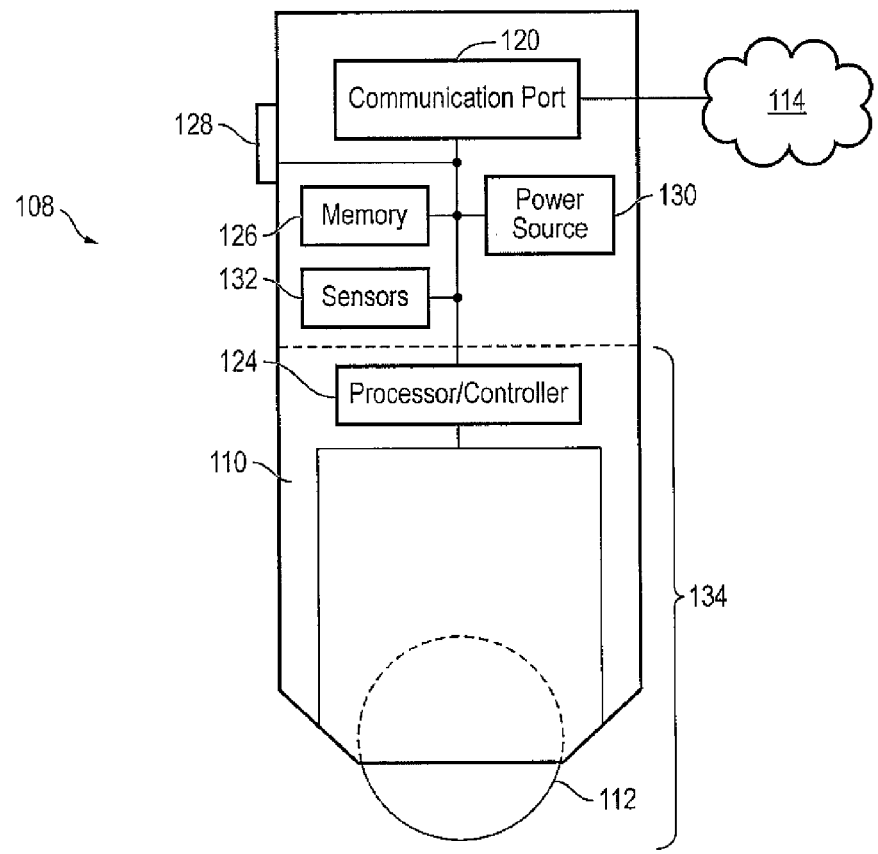
FIG. 2A illustrates further detail of a stylus operating as part of a haptic feedback system, according to embodiments of the present invention.

FIG. 2A illustrates further detail of the stylus 108 operating as part of the haptic feedback system 100, according to example embodiments of the present invention. As discussed above, the stylus 108 is connected to or in electronic communication with the electronic device 102 by way of a data communication interface 114. The stylus 108 includes a communication port 120, which is in electronic communication with the electronic device 102 by way of the data communication interface 114 for exchanging (e.g., sending and receiving) data signals with the electronic device 102. The communication port 120 represents one or more electronic communication data ports capable of sharing input and output data with external devices. The communication port 120 may be configured to receive data cables with a wired interface such as high-speed Ethernet, Universal Serial Bus (USB), High-Definition Multimedia Interface (HDMI), audio cable, or other similar analog or digital data interface. Alternatively, the communication port 120 may be configured to receive and transmit input and output (I/O) data wirelessly, for example, using available electromagnetic spectrum.

The communication port 120 is in electronic communication with a processor or controller (e.g., a traction controller) 124 of the stylus 108, which processes data received by the communication port 120. The stylus 108 further includes several other components that are controlled by the processor 124. For example, the stylus 108 may include a mass storage device or memory 126, representing one or more memory devices or components electrically connected to the processor 124 for storing data on non-volatile memory for future access by the processor 124. The memory 126 may include any suitable mass storage device such as flash memory, secure digital (SD) memory, etc. The memory 126 may further include an addressable memory unit for storing software instructions to be executed by the processor 124. For example, the memory 126 may include any suitable addressable memory device, such as a random access memory (RAM), and may additionally operate as a computer-readable storage medium having non-transitory computer readable instructions stored therein that, when executed by a processor, cause the processor to control components of the haptic feedback system 100 to provide haptic feedback to a user operating the haptic feedback system 100.

The stylus 108 may further include one or more user input devices (e.g., buttons or switches) 128 to enable user interaction with the stylus 108 and/or the electronic device 102. For example, the user input device 128 may include a button electrically coupled to the processor 124 for interacting with or providing input to the electronic device 102 (e.g., by way of the processor 124, the communication port 120, and the communication interface 114) according to the location of the stylus 108. The user input device 128 may further include, for example, a power switch electrically coupled to the processor 124 and/or a power source 130 for turning on and off a power supply to the components of the stylus 108. The power source 130 may include a battery system (e.g., a rechargeable battery system), and/or may be configured to receive power from an external source. According to some embodiments, the power source 130 may include an inductive power component for receiving electronic power from an external device (e.g., the electronic device 102) through electromagnetic radiation.

The stylus 108 may further include a position sensor 132 electrically coupled to the processor 124. The position sensor 132 may include an accelerometer capable of sensing and measuring the movement and acceleration of the stylus 108 (e.g., relative to the position or orientation of the electronic device 102). The position sensor 132 may further include an orientation sensor (e.g., a gyroscopic sensor or magnetometer) capable of sensing the orientation and/or rotation of the stylus 108 (e.g., relative to the position or orientation of the electronic device 102, or a corresponding gyroscopic sensor or magnetometer in the electronic device 102).

As will be discussed in further detail below, based on data signals received from the electronic device 102 (e.g., by way of the communication interface 114 and the communication port 120), the user input devices 128, and the sensors 132, the processor or controller 124 operates as part of a friction system 134 of the stylus 108 to provide haptic feedback to a user operating the stylus 108 and the electronic device 102.

Figure 2B:
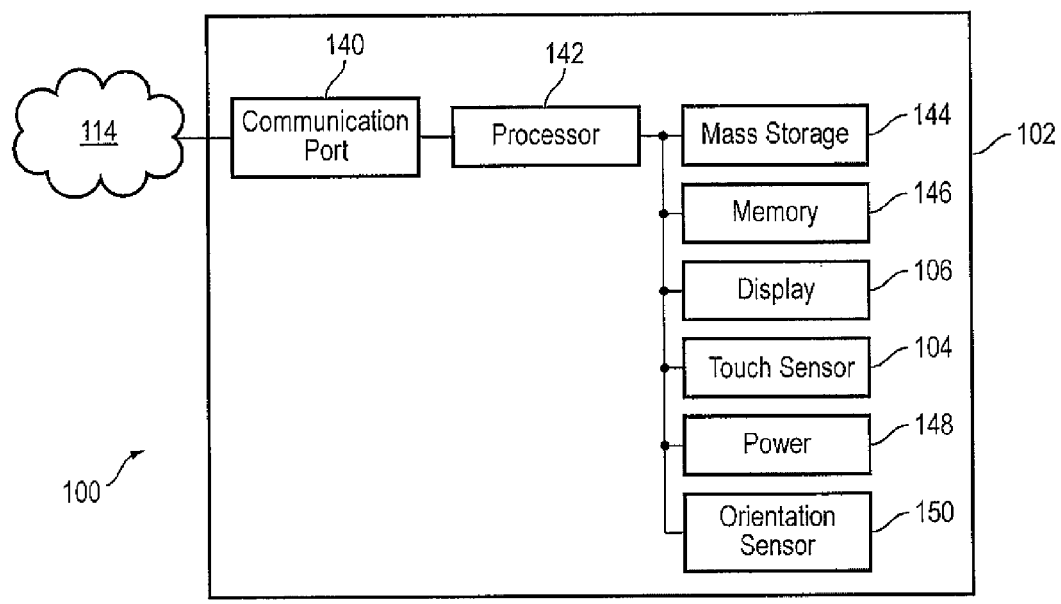
FIG. 2B illustrates further detail of an electronic device operating as part of a haptic feedback system, according to embodiments of the present invention.

FIG. 2B illustrates further detail of the electronic device 102 operating as part of the haptic feedback system 100, according to example embodiments of the present invention. The electronic device 102 includes a communication port 140, which is in electronic communication with the communication interface 114 for sending and receiving data signals to the stylus 108 and/or other electronic devices. The communication port 140 represents one or more electronic communication data ports capable of sharing input and output data with external devices. Communication port 140 can be configured to receive data cables with a wired interface such as high-speed Ethernet, USB, HDMI, audio cable, or other similar analog or digital data interface. Alternatively, communication port 140 may be configured to receive and transmit I/O data wirelessly, for example, using available electromagnetic spectrum.

The communication port 140 is in electronic communication with a processor 142 of the electronic device 102 for processing data received by the communication port 140 and for transmitting data processed by the processor 142 to other external devices connected to the communication interface 114 (e.g., the stylus 108).

The electronic device 102 further includes several other components that are controlled by the processor 142. For example, mass storage device or hard disk 144 is electrically connected to the processor 142 for storing data files on non-volatile memory for future access by the processor 142. The mass storage device 144 can be any suitable mass storage device such as a hard disk drive (HDD), flash memory, secure digital (SD) memory card, magnetic tape, compact disk, or digital video disk. The electronic device 102 may further include electronic memory 146 for addressable memory or RAM data storage. Collectively, the processor 142, mass storage device 144, and electronic memory 146 may operate to facilitate providing haptic feedback to a user operating the electronic device 102 and the stylus 108, such that the electronic memory 144 and/or 146 operate as a computer-readable storage medium having non-transitory computer readable instructions stored therein that when executed by the processor 142 cause the processor 142 to control the components of the electronic device 102, and control sending and receiving data to the stylus 108 to control the operation of the friction system 134 of the stylus 108, as will be discussed in more detail below.

The electronic device 102 further includes the display 106, which is positioned externally on the electronic device 102 to facilitate user interaction with the electronic device 102. The display 106 may be a light-emitting diode (LED) display, liquid crystal display (LCD), organic LED (OLED) display, or other suitable display capable of graphically displaying information and images to users. In one embodiment the display is a touch screen display including the touch sensor 104 capable of sensing touch input from users. Alternatively, according to some embodiments, the touch sensor 104 may include a touch pad interface located separately from the display 106.

The electronic device 102 further includes a power source 148, which may include a battery (e.g., a rechargeable battery) and/or may be configured to receive an alternating or direct current electrical power input from an external source for operation of the electronic device 102.

The electronic device 102 may further include an orientation sensor 150. The orientation sensor 150 may include an accelerometer capable of sensing and measuring the movement and acceleration of the electronic device 102 (e.g., relative to the position or orientation of the stylus 108). The orientation sensor 150 may further include an orientation sensor (e.g., a gyroscopic sensor or magnetometer) capable of sensing the orientation andlor rotation of the electronic device 102 (e.g., relative to the position or orientation of the stylus 108, or a corresponding gyroscopic sensor or magnetometer in the stylus 108, such as the sensor 132).

Additionally, the electronic device 102 may include additional components that are the same as or similar to those of the stylus 108, and vice versa. Additionally, the functionality of some of the components shown in the stylus 108 may be performed by components in the electronic device 102, and vice versa. For example, according to some embodiments, in which the communication port 126 is configured to receive analog data signals from the electronic device 102 in a wired configuration, the processor or controller 124 may be located in or integrated with the electronic device 102, or the processor 142, for example, may operate to drive a friction actuator of the stylus 108 for adjusting the friction or pressure applied to the roller 112.

As will be discussed in more detail below, users may interact with the stylus 108 and the touch sensor 104 of the electronic device 102 to provide user input to the electronic device 102. According to the images displayed on the display 106, texture data corresponding to the displayed images, and the movement of the stylus 108 relative to the electronic device 102, the haptic feedback system 100 may operate to provide haptic feedback to the user through the stylus 108.

Figure 3:
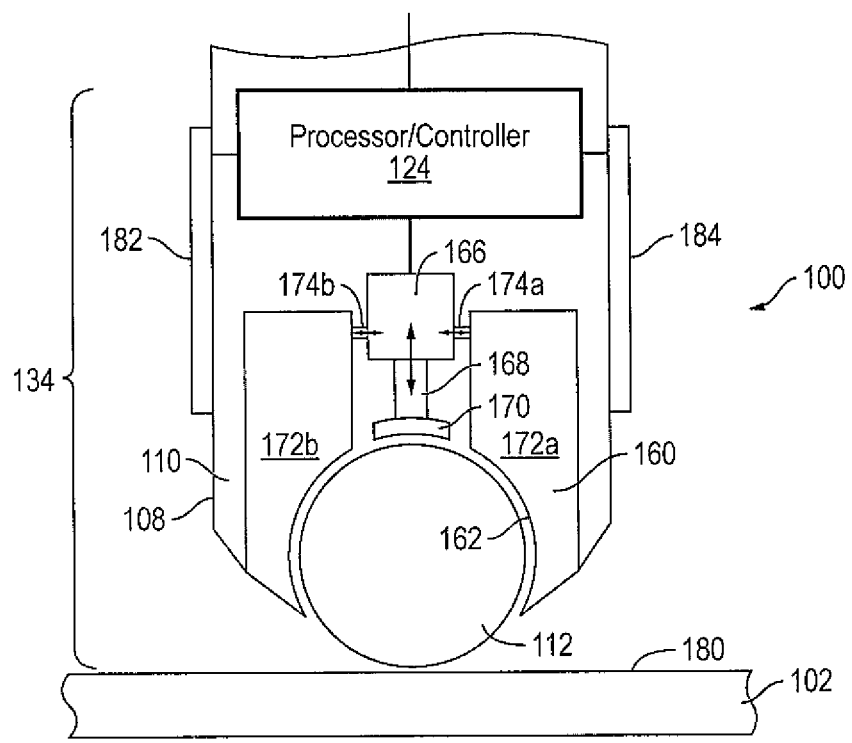
FIG. 3 illustrates further details of the components of a stylus and a friction system operating with a touch sensor as part of a haptic feedback system, according to embodiments of the present invention.

FIG. 3 illustrates further detail of the stylus 108 and the friction system 134 operating with the touch sensor 104 as part of the haptic feedback system 100, according to embodiments of the present invention. The friction system 134 includes the roller 112, which is held to (or secured within) the stylus 108 by a bearing housing 160. According to some embodiments of the present invention, the roller 112 may have a generally spherical shape, and an internal surface 162 of the bearing housing 160 that faces the roller 112 may also have a generally spherical shape to accommodate the roller 112. Accordingly, the bearing housing 160 may generally enclose the roller 112 with the exception of a portion of the roller 112 that is exposed outside of the stylus 108 for contacting a contact interface.

The friction system 134 further includes a friction actuator 166 in electronic communication with the processor 124 to control a variable force applied against the roller 112 within the bearing housing 160. That is, in response to signals provided by the processor 124, the friction actuator 166 may apply a force or pressure against the roller to increase friction between a friction modulator and the roller 112. The friction actuator 166 may be any suitable actuator configured to generate a variable force against the roller 112. For example, the friction actuator 166 may include a piezoelectric component, a worm screw system, or a rotary motor system configured to convert rotational motion into a linear force. The friction actuator 166, for example, may include a piston or rod 168 mechanically coupled to the friction actuator 166 and a friction modulator 170. In response to signals from the processor 124, the friction actuator 166 may generate a linear force against the roller 112 through the rod 168 and the friction modulator 170. That is, the friction modulator 170 may extend through an opening in the bearing housing 160 to contact or apply a pressure against the roller 112 in response to a control signal received by the friction actuator 166 from the processor or controller 124.

According to some embodiments, the internal surface 162 of the bearing housing 160 may also operate as a friction modulator. For example, the bearing housing 160 may include a plurality of sections 172*a*-172*b* (the number, size, and shape of the sections may vary according to the design and function of the haptic feedback system 100), that are mechanically coupled to pistons or rods 174*a*-174*b*, respectively, of the friction actuator 166. In response to signals from the processor 124, the friction actuator 166 may generate a force against the roller through the rods 174*a*-174*b* and the sections 172*a*-172*b* of the bearing housing 160, such that the sections 172*a*-172*b* of the bearing housing 160 move toward and away from the roller 112 to operate as a friction modulator. According to some embodiments, the friction actuator 166 may cause the bearing sections 172*a*-172*b* to be axially shifted to increase the friction between the roller 112 and the bearing surface 162.

When the friction actuator 166 is in an unrestrained or passive state (e.g., no force or pressure is being applied by the friction actuator 166 against the roller 112), the roller 112 may roll relatively freely within the bearing housing 160 against the internal bearing surface 162 of the bearing housing 160. Thus, the coefficient of friction between the bearing surface 162 and the roller 112 may be relatively low compared to the coefficient of friction between the roller 112 and an interface surface (e.g., a top surface of the electronic device 102 or the touch sensor 104) 180 of the electronic device 102.

The friction modulator (e.g., the friction modulator 170 and/or the sections 172*a*-172*b* of the bearing housing 160), on the other hand, applies a variable frictional force to apply controlled variable pressure to the roller 112, thereby adjusting (e.g., increasing and decreasing) the ability of the roller 112 to roll within the bearing housing 160. The coefficient of friction between the friction modulator and the roller 112, according to some embodiments, may be relatively low when the friction actuator 166 is in a passive state. For example, the coefficient of friction between the friction modulator and the roller 112 may be equal (or about equal) to the coefficient of friction between the bearing surface 162 and the roller 112. When the friction actuator 166 applies a force against the roller 112 (e.g., through the friction modulator), however, the friction on the roller 112 may increase significantly due to a small amount of force against the roller 112, and may, for example, increase the friction by 10 times compared to when the friction actuator 166 is in a passive state where no force is applied against the roller 112.

Accordingly, the friction actuator 166 includes a contact surface (e.g., the friction modulator 170 or the sections 172*a*-172*b* of the bearing housing 160) for applying a force against the roller. When a force is applied by the friction actuator 166 against the roller 112, the contact surface may provide a high coefficient of friction against the roller 112 such that the roller turns less freely due to the increased friction between the contact surface and the roller.

Thus, as described above, the haptic feedback system includes at least three frictional interfaces. The first frictional interface between the roller 112 and the interface surface 180 of the electronic device 102 may have a relatively high coefficient of friction. Thus, the roller 112 and the interface surface 180 may be made of materials for which there is a relatively high coefficient of friction. For example, the roller 112 and the interface surface 180 may be made of glass such that the coefficient of static friction between the roller 112 and the interface surface 180 is about 0.9. With such a high coefficient of static friction, the roller 112 will tend to roll against the interface surface 180, rather than sliding. The materials of the roller 112 and the interface surface 180 are not limited to glass, however, and the materials of the roller 112 and the interface surface 180 may include any suitable materials between which there is a relatively high static coefficient of friction compared to the static and dynamic coefficients of friction between the roller 112 and the bearing surface 162. That is, according to embodiments of the present invention, the coefficient of friction between the roller 112 and the interface surface 180 is at least twice the static and dynamic coefficients of friction between the roller 112 and the bearing surface 162. For example, the materials of the roller 112 and the interface surface 180 may include glass, metal (e.g., nickel, steel, iron), polycarbonate, or any other suitable roller and interface surface materials.

The second frictional interface between the roller 112 and the bearing surface 162 may have a relatively low coefficient of friction (compared to the coefficient of friction between the roller 112 and the interface surface 180). Thus, the roller 112 and the bearing surface 162 may be made of materials for which there is a relatively low coefficient of friction. For example, in the case of the roller 112 being made of glass, the bearing surface 162 may be made of polytetrafluoroethylene (PTFE) (e.g., Teflon®) or polyoxymethylene (POM) (e.g., Delrin®), such that the coefficient of static friction (when the roller 112 is not rolling) and dynamic friction (when the roller 112 is rolling) is about 0.1. With such low coefficients of friction, the roller 112 will tend to roll freely inside the bearing housing 160. The materials of the roller 112 and the bearing surface 162 are not limited to glass and PTFE or POM, however, and may include any suitable materials between which there is a relatively low static and dynamic coefficient of friction (e.g., no more than one-half the coefficient of friction between the roller 112 and the interface surface 180). Because the coefficient of friction between the roller 112 and the bearing surface 162 is relatively low compared to the coefficient of friction between the roller 112 and the interface surface 180 (e.g., no more than one-half), the roller 112 may roll across the interface surface 180 without slipping when the friction actuator 166 is in a passive state. According to some embodiments, the ratio of coefficients of friction between the first frictional interface (between the roller 112 and the interface surface 180) and the second frictional interface (between the roller 112 and the bearing surface 162) may be about 9:1 or 10:1.

The third frictional interface between the friction modulator (e.g., the friction modulator 170 and/or the sections 172a-172b of the bearing housing 160) and the roller 112 is variable depending on the signal provided to the friction actuator 166 and the amount of force or pressure generated against the roller 112 by the friction actuator 166. The coefficient of friction of the third frictional interface may vary, for example, between that of the first and second frictional interfaces.

Thus, when the friction actuator 166 is in a passive state and is not applying any pressure against the roller 112, the roller 112 can roll freely within the bearing housing 160 with the only resistance being the frictional forces between the roller 112 and the bearing housing 160. By contrast, when the friction actuator 166 is completely engaged such that the friction modulator generates a maximum amount of friction against the roller 112, the roller 112 may not turn within the bearing housing 160 and may slip against the interface surface 180.

The maximum surface friction possible without slippage between the roller 112 and the interface surface 180 can be calculated according to equation 1, below:

$$F_f = F_N * \mu_s \quad (1)$$

where $F_f$ is the frictional force on a plane of the interface surface 180, $F_N$ is the downward or normal force (based on the force applied by the user and the weight of the stylus) between the stylus 108 and the interface surface 180, and $\mu_s$ is the coefficient of static friction between the roller 112 and the interface surface 180. For example, in the case where the roller 112 is made of glass, and the interface surface 180 is made of glass, if there is a 4.5 Newtons (N) downward force (e.g., about 1 pound), the coefficient of static friction $\mu_s$ between the roller 112 and the interface surface 180 would be about 0.9, such that $F_{max}$ is about 4 N. When $F_N$ is greater than $F_{max}$, the roller 112 will slip against the interface surface 180 instead of roll.

There may also be a minimum amount of normal force applied between the stylus 108 and the interface surface 180 to cause the roller 112 to turn within the bearing housing 160, which may be calculated according to equation 2 below:

$$F_f = F_N * \mu_d \quad (2)$$

where $\mu_d$ is the coefficient of dynamic friction between the roller 112 and the bearing surface 162. For example, in the case of the roller 112 being made of glass and the bearing surface 162 being POM, the coefficient of static friction $\mu_d$ between the roller 112 and the bearing surface 162 would be about 0.1, such that the minimum force $F_{min}$=0.45 N. When $F_N$ is less than $F_{min}$, the roller 112 may not turn against the bearing surface 162, and the stylus 108 may not move or the roller 112 may slip against the interface surface 180.

As illustrated above, according to equations 1 and 2, if the normal force $F_N$ is greater than $F_{max}$, the roller 112 may begin to slip against the interface surface 180. If, however, the normal force $F_N$ is less than $F_{min}$, the roller 112 may not turn inside the bearing housing 160.

The friction actuator 166 may utilize the friction modulator to create a frictional force between the minimum and maximum forces to permit the roller 112 to turn only when the user applies a shear force in the stylus housing 110 that exceeds the corresponding frictional force according to the desired texture or haptic feedback.

Figure 4A:
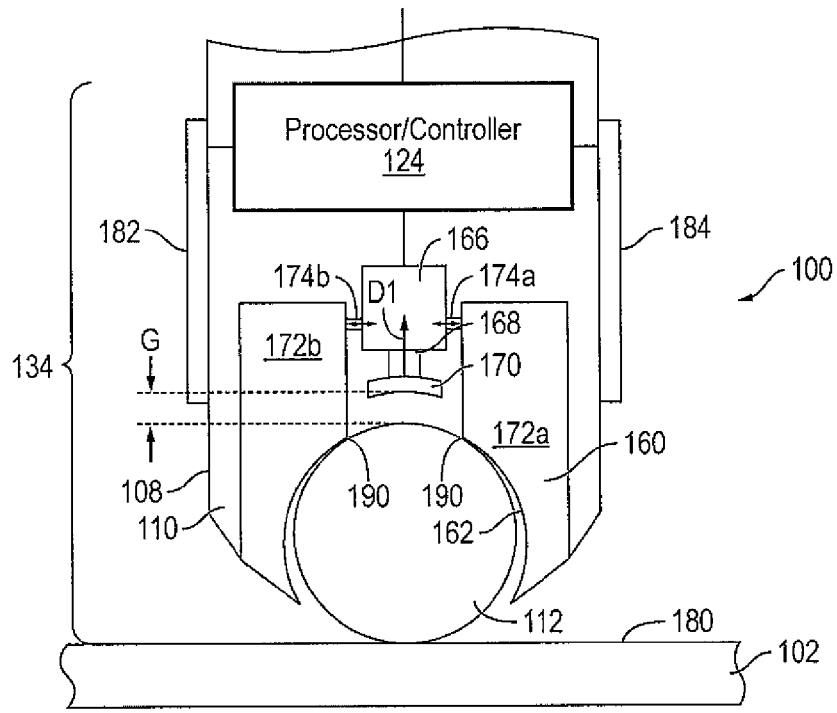
FIGS. 4A and 4B illustrate the force distribution within a stylus operating as part of a haptic feedback system, according to embodiments of the present invention.
Figure 4B:
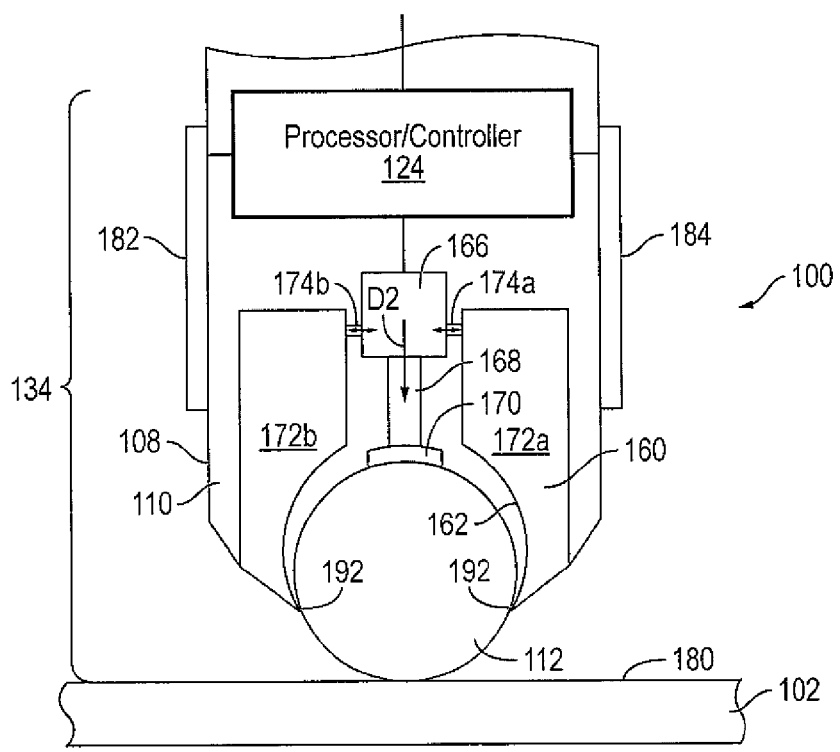

FIGS. 4A and 4B illustrate the force distribution within the stylus 112 operating as part of the haptic feedback system 100, according to embodiments of the present invention. According to some embodiments, the force of the contact surface (e.g., the friction modulator 170 and/or the sections 172a-172b of the bearing housing 160) being pressed against the roller 112 by the friction actuator 166 and the force of the display surface 180 against the roller 112 may cause the roller 112 to be pressed against the internal surface of the bearing housing 160. Different parts of the internal surface 162 of the bearing housing 160 carry a force against the roller 112, depending on whether the friction actuator 166 is passive or active.

For example, FIG. 4A illustrates a case where the friction actuator 166 is in a passive state. As shown in FIG. 4A, when the friction actuator 166 is in a passive state, the friction modulator 170 is drawn toward the friction actuator 166 in a direction D1 away from the roller 112 such that the friction modulator 170 is separated from the roller 112 by a gap or separation distance G. The displacement of the friction modulator 170 (e.g., the gap G) may be relatively small when the materials of the bearing housing 160, the roller 112, and the friction modulator 170 have sufficient hardness such that their materials are not easily compressed. When the friction modulator 170 is separated from the roller 112, but the stylus 108 is pressed by the user against the interface surface 180, the internal surface 162 of the bearing housing 160 contacts the roller 112 at a contact region 190, which is at the upper portion of the internal bearing surface 162 relative to the interface surface 180. Thus, when the friction actuator 166 is in a passive state, the contact region 190 at the upper region of the internal surface 162 of the bearing housing 160 carries the force of the stylus pressure.

FIG. 4B illustrates a case where the friction actuator 166 is in an active state and applying a force against the roller 112. As shown in FIG. 4B, when the friction actuator 166 is in an active state, the friction modulator 170 is pushed toward the roller in a direction D2, opposite the direction D1, and the friction modulator 170 is in contact with the roller 112. When the friction modulator 170 is in contact with the roller 112, the internal surface 162 of the bearing housing 160 contacts the roller 112 at a contact region 192, which is a lowermost portion of the internal bearing surface 162 relative to the interface surface 180. Thus, when the friction actuator 166 is in an active state, the contact region 192 at the lower region of the internal surface 162 of the bearing housing 160 carries the force of the pressure from the friction actuator 166. According to some embodiments of the present invention, force of the roller 112 being pressed against the internal surface 162 of the bearing housing 160, in combination with the force of the contact surface against the roller 112, may cause the roller 112 to turn less freely within the bearing housing 160. In embodiments in which the friction actuator 166 includes a piezo-electric driver, the modulation of friction against the roller 112 may be adjusted with a relatively high frequency.

Although FIGS. 4A and 4B illustrate the roller 112 translating or moving vertically within the chamber of the bearing surface 162 such that there is a gap between the roller 112 and the bearing surface 162 at various areas around the roller 112, according to some embodiments, the roller 112 may be in contact with all or a majority of the bearing surface 162 even when the friction actuator 166 is in a passive state. That is, the surface or contour of the bearing surface 162 may have a substantially similar contour as the roller 112 such that the roller 112 fits snugly within the bearing housing 160.

Figure 5A:
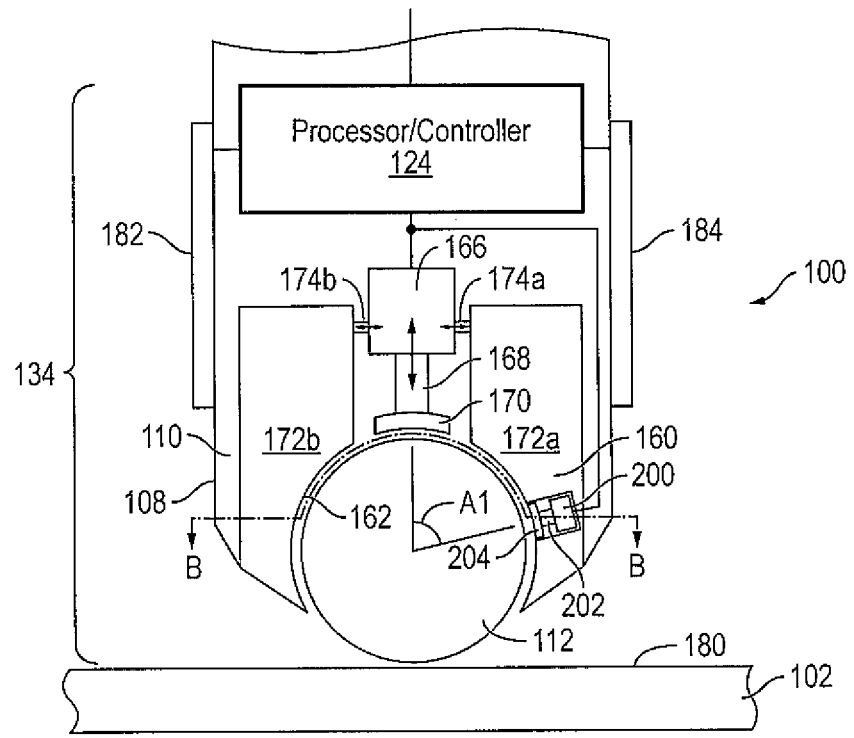
FIGS. 5A and 5B illustrate further detail of a stylus including a plurality of friction actuators, according to embodiments of the present invention.
Figure 5B:
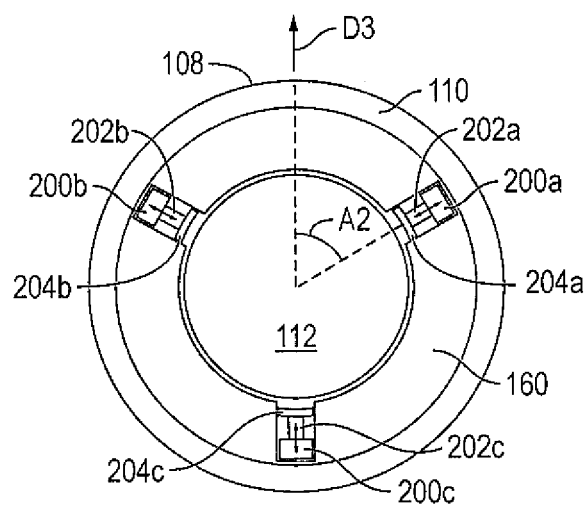

FIGS. 5A and 5B illustrate further detail of the stylus 108, in which additional friction actuators are included in the stylus 108 to provide anisotropic frictional forces against the roller 112, according to embodiments of the present invention. That is, the stylus 108 may include the components discussed above, but may additionally include one or more additional friction actuators 200 configured to apply a force against the roller 112 from different angles around the periphery of the roller 112.

For example, as shown in FIG. 5A, the friction actuator 200 may be in electronic communication with the processor 124 to control a variable force applied against the roller 112 within the bearing housing 160 at an angle A relative to the direction of the force applied against the roller 112 by the friction actuator 166. For example, the friction actuator 200 may include a rod or piston 202 coupled to a friction modulator 204. In response to signals provided by the processor 124, the friction actuator 200 may apply a force or pressure against the roller 112 to increase and/or decrease friction between the friction modulator 204 and the roller 112 by causing the rod 202 and the friction modulator 204 to press against the surface of the roller 112. That is, when the a lateral force is applied to the stylus 108 in a first direction, the haptic feedback system 100 may modulate the friction applied to the roller 112 such that it has a different rolling resistance when moving in a first direction compared to a second direction across the surface 180.

FIG. 5B illustrates a top view of the stylus 108 taken along the line B-B shown in FIG. 5A. As shown in FIG. 5B, the stylus 108 may include a plurality of friction actuators 200a-200c arranged at various locations around the periphery or circumference of the roller 112. The friction actuators 200a-200c may be integrated within the bearing housing 160, or may be external with respect to the bearing housing 160 (e.g., integrated with or coupled to the housing 110). Although the embodiment shown in FIG. 5B includes three friction actuators 200a-200c positioned equidistant from each other around the periphery of the roller 112, the number and relative locations of the various friction actuators may vary according to the design of the haptic feedback system 100. Each of the friction actuators 200a-200c may include a rod or piston 202a-202c, respectively, for applying a linear force against the roller 112 through a corresponding friction modulator 204a-204c.

Depending on the direction of force applied to the roller 112 by the friction actuators 200a-200c and the direction of shear or lateral force applied to the stylus 108, the friction applied to the roller may vary. For example, as shown in FIG. 5B, when a lateral or shear force is applied against the stylus 108 in a direction D3 along the plane of the interface surface 180, the angle A2 between the direction D3 and the direction of force applied by the friction actuators 200a-200c may influence the amount of friction applied to the roller 112 by the stylus 108. For a given amount of force applied by one of the friction actuators 200a-200c, the friction between the roller 112 and the stylus 108 may be greatest when the angle A2 is zero degrees or 180 degrees (e.g., when the direction of force from the friction actuator 200a-200c is parallel to the direction of shear or lateral force applied to the stylus 108). Alternatively, the friction between the roller 112 and the stylus 108 may be smallest when the angle A2 is equal to 90 degrees or 270 degrees (e.g., when the direction of force from the friction actuator 200a-200c is perpendicular to the direction of shear or lateral force applied to the stylus 108).

Thus, by including multiple friction actuators (e.g., the friction actuator 166 and the friction actuators 200a-200c), the haptic feedback system 100 may provide anisotropic frictional forces against the roller 112 according to the lateral forces applied to the stylus 108 by the user, the location of the stylus 108 relative to the interface surface 180, with a physical relationship to the images displayed by the display panel 106, to adjust the amount of friction applied to the roller 112 by the stylus 108. For example, an image displayed on the display panel 106 may represent a textured surface such as a wood grain, in which the haptic feedback system 100 applies a greater amount of friction to the roller 112 when the stylus 108 is moved over or against the grain of the wood, and a lower amount of friction to the roller 112 when the stylus 108 is moved along or with the grain of the wood. Thus, according to embodiments of the present invention, the haptic feedback system 100 may adjust the friction applied to the roller 112 differently according to the direction in which the stylus 108 is moved (or according to the direction of the lateral force applied to the stylus) by utilizing a plurality of friction actuators 166 and 200a-200c.

In the case of multiple friction actuators (e.g., the friction actuators 200a-200c), the haptic feedback system 100 may determine the direction or orientation of the stylus 108 relative to the direction or orientation of the interface surface 180 or the electronic device 102. For example, the haptic feedback system 100 may compare an orientation measurement of the sensor 132 within the stylus 108 with an orientation measurement of the sensor 150 within the electronic device 102 to determine the relative orientations between the stylus 108 and the electronic device 102. In another embodiment, the stylus 108 may include a contoured grip or a graphical image (e.g., an arrow or label) to encourage the user to hold the stylus 108 in a certain position relative to the orientation of the electronic device 102.

Returning to FIG. 3, the stylus 108 may further include a plurality of strain gauges 182 and 184 at two or more locations on the side of the stylus 108. The strain gauges 182 and 184 are in electronic communication with the processor 124, and are configured to detect or measure a lateral or shear force applied to the stylus 108. By measuring the shear or lateral forces applied to the stylus 108, as well as having a plurality of multi-axial friction modulators or friction actuators as illustrated in FIGS. 5A and 5B, the haptic feedback system 100 may adjust the friction against the roller 112 to guide the path of the stylus 108, such that the stylus is permitted to move easily in one direction but it is difficult (due to increased friction against the roller 112) to move the stylus in another direction. Thus, by including transducers such as the strain gauges 182 and 184 as part of the stylus 108, the haptic feedback system 100 may therefore have a closed-loop feedback control to create desired friction levels according to the lateral forces applied by the user on the stylus 108. That is, the haptic feedback system 100 may adjust the friction against the roller 112 when a user applies a lateral force against the stylus 108, even before the stylus 108 moves relative to the interface surface 180.

The strain gauges 182 and 184 may additionally be configured to measure vertical pressure applied to the stylus 108 by a user. Accordingly, the haptic feedback system 100 may adjust (e.g., increase or decrease) the friction applied by the friction actuators against the roller 112 depending on the force applied by the user to maintain a coefficient of friction between the friction modulator and the roller 112 even when the force applied by the user on the stylus varies. Although the strain gauges 182 and 184 are shown on the external edges of the stylus 108, according to some embodiments of the present invention, the strain gauges may alternatively or additionally be positioned internally within the stylus 108. According to some embodiments, the stylus 108 may further include a strain gauge configured to measure axial pressure on the stylus 108.

Figure 6:
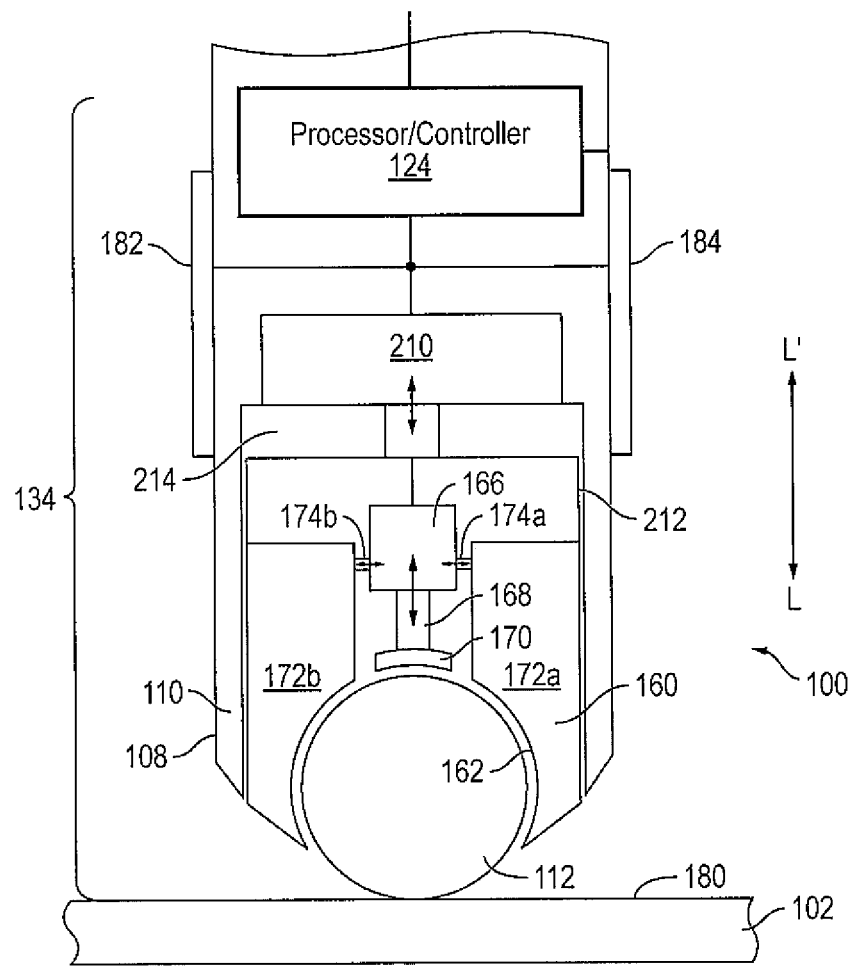
FIG. 6 illustrates further detail of a friction system of a stylus that includes an axial actuator, according to some embodiments of the present invention.

FIG. 6 illustrates further detail of the friction system 134, in which the stylus 108 includes an axial actuator 210, according to some embodiments of the present invention. As illustrated in FIG. 6, the friction actuator 166, the bearing housing 160, and the roller 112 may be mechanically coupled to each other within a friction component or housing 212. The friction component 212 may be positioned within a linear slide bearing (e.g., a cavity or chamber) 214, and configured to translate or slide in a linear direction L-L' (e.g., parallel to the housing 110 of the stylus 108), due to a pressure or force applied by the axial actuator 210. The axial actuator 210 is electrically coupled to the processor 124 and mechanically coupled to the friction component 212 to move the friction component 212 forwards and backwards along the direction L-L' within the linear slide bearing 214 in response to data signals received by the processor 124.

Thus, according to some embodiments of the present invention, the axial height of the bearing housing 160 and the roller 112 of the stylus 108 may be isolated from the body of the stylus 108 such that the height or position of the roller 112 is adjustable (e.g., can translate or slide) relative to the housing 110 of the stylus 108, based on signals from the processor 124. Unlike a vibratory motor, the axial actuator 210 can generate a force against the interface surface 180 (through the friction component 212 and the roller 112) without shaking a reaction mass. Accordingly, the haptic feedback system 100 may control the axial "bump" of the stylus 108 to emulate writing on rough or bumpy surfaces.

Figure 7A:
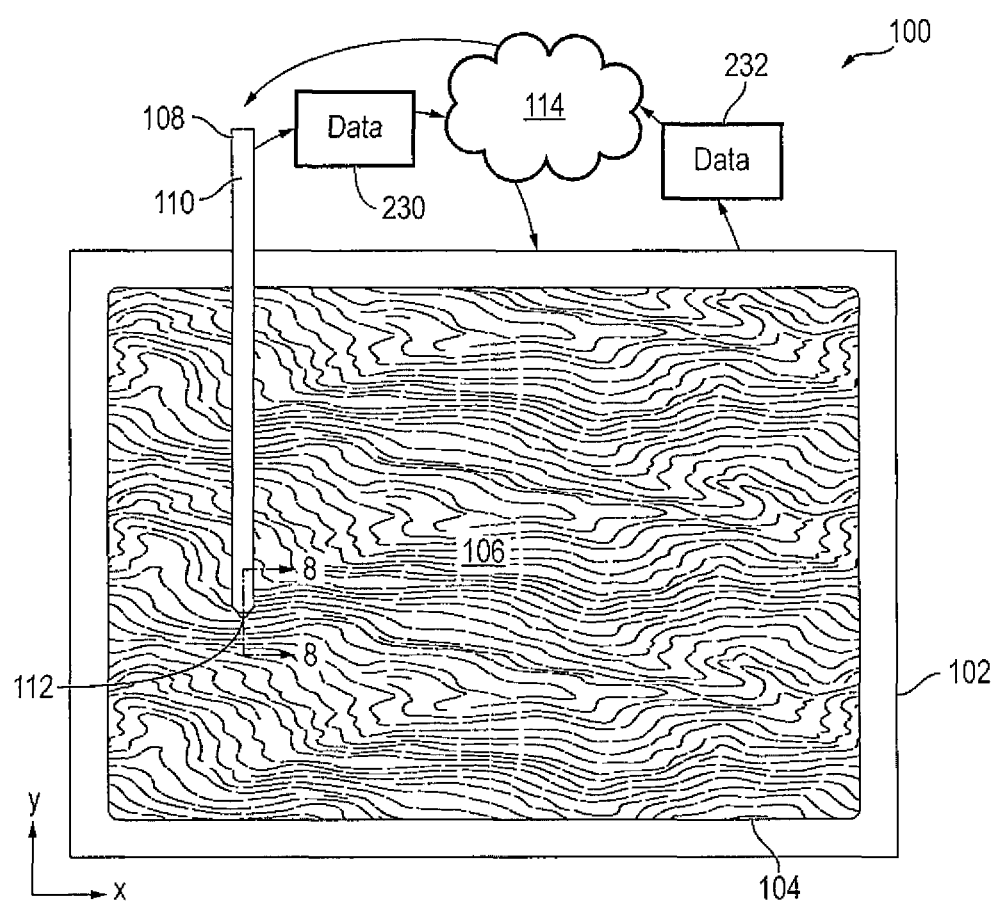
FIGS. 7A and 7B illustrate an example of a stylus operating with an electronic device as part of a haptic feedback system, according to embodiments of the present invention.
Figure 7B:
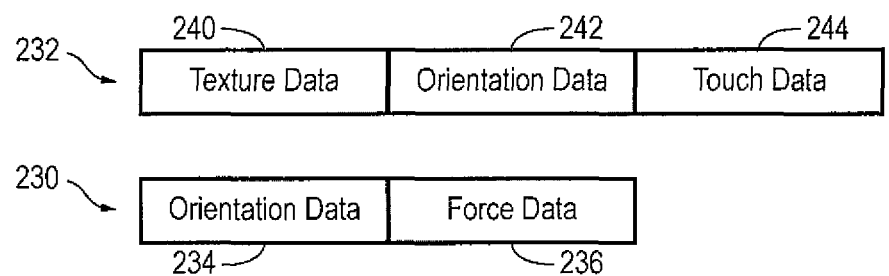

FIGS. 7A and 7B illustrate an example of the stylus 108 operating with the electronic device 102 as part of the haptic feedback system 100, according to embodiments of the present invention. As discussed above, the display panel 106 is configured to display images, and according to the touch locations of the stylus 108, the movement of the stylus 108 across the touch sensor 104, and the simulated texture of the images displayed, the haptic feedback system 100 may adjust the friction applied to the roller 112 within the stylus 108 to simulate a texture.

As shown in FIG. 7A, during operation of the haptic feedback system 100, the stylus 108 and the electronic device 102 exchange data 230 and 232, respectively, to each other by way of the communication interface 114 (e.g., through the communication ports 120 and 140). As shown in FIG. 7B, the data 230 sent by the stylus 108 to the electronic device 102 may include orientation data 234 that indicates the orientation measurements that are measured or calculated by the sensor 132, and force data 236 that indicates the shear force and vertical force applied by the user with the stylus 108 against the electronic device as measured by the strain gauges 182 and 184.

The data 232 sent by the electronic device 102 to the stylus 108 may include texture data 240 corresponding to an image displayed on the display panel 106. The texture data 240 may include, for example, data indicating an amount of friction that should be applied to the roller 112 depending on a touch location of the stylus 108 on the interface surface 180, the type of writing instrument being simulated, and/or the speed with which the roller 112 or stylus 108 is moved (e.g., rolled) across the interface surface 180. According to some embodiment, the texture data 240 may include information or data indicating an amount of force to be applied to the roller 112 by the friction actuators (e.g., the friction actuator 166 and 200a-200c), or indicating a change in the axial height of the roller 112 within the stylus 108 (e.g., using the axial actuator 210) based on the speed and direction of movement of the stylus 108 (or the roller 112) moving across the interface surface 180 or relative to the image displayed by the display 106. Thus, according to embodiments of the present invention, the haptic feedback system 100 may adjust the friction between the roller 112 and the stylus 108, or adjust the axial position of the roller 112 within the stylus 108, based on the speed or direction of movement of the stylus 108 relative to the interface surface 180 or a displayed image as indicated by the texture data 240. The data 232 may further include orientation data 242 that indicates orientation measurements that are measured or calculated by the sensor 150, and touch data 244 that indicates the touch locations of the stylus 108 on the interface surface 180.

Returning to FIG. 7A, as the user applies a lateral force (e.g., relative to the plane of the touch sensor 104 or the interface surface 180) against the stylus 108, the haptic feedback system 100 may adjust the friction applied to the roller 112 within the stylus 108 to simulate various textures of images displayed on the display panel 106. For example, for the purposes of illustration, a wood grain texture is depicted in FIG. 7A. However, embodiments of the present invention may be configured to simulate any other suitable texture according to the design of the haptic feedback system 100.

Figure 8:
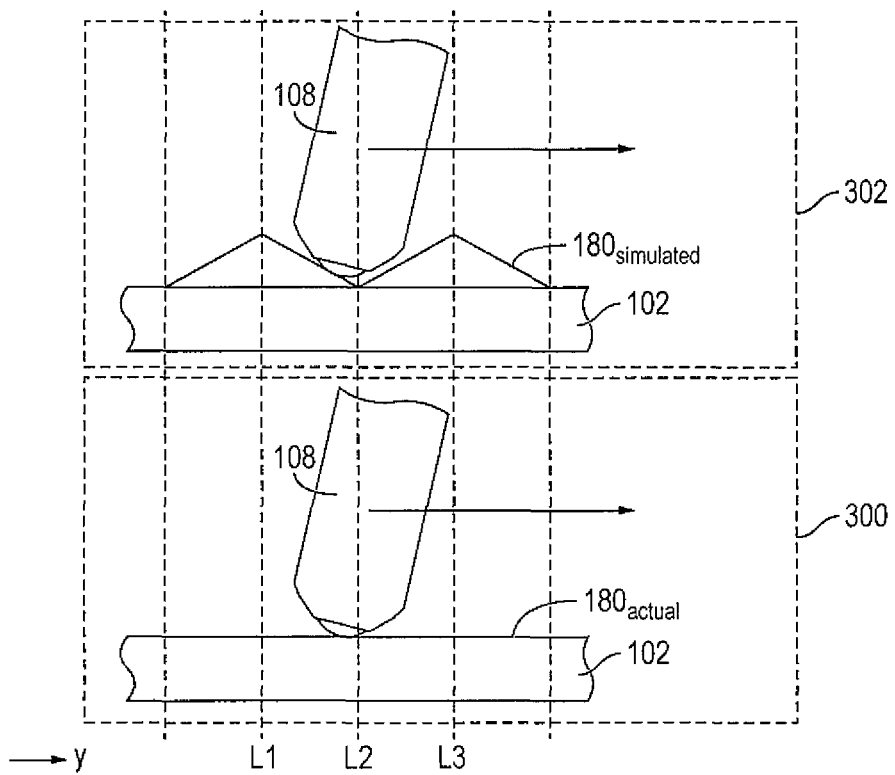
FIG. 8 illustrates a cross-sectional representation of haptic feedback generated by a haptic feedback system as a user applies a lateral force against a stylus in contact with an interface surface, according to embodiments of the present invention.

As the user applies a lateral force against the stylus 108 at a location where the corresponding texture data indicates a smooth or consistent texture (e.g., along the grain of the wood texture in the X direction shown in FIG. 8), the haptic feedback system 100 may apply a relatively low amount of friction against the roller 112. By contrast, when the user applies a lateral force against the stylus 108 at a location where the corresponding texture data indicates a rough or inconsistent texture (e.g., against the grain of the wood texture in the Y direction shown in FIG. 8), the haptic feedback system may apply a relatively higher amount of friction against the roller 112.

FIG. 8 illustrates, for example, a cross-sectional representation of the haptic feedback generated by the haptic feedback system 100 as the user applies a lateral force against the stylus 108 in contact with the interface surface 180 of the electronic device 102. The lower portion 300 illustrates the actual texture of the interface surface $180_{actual}$ of the electronic device 102, which is planar along the Y-direction. The upper portion 302 illustrates the perceived or simulated texture of the interface surface $180_{simulated}$ between the stylus 108 and the electronic device 102, when a texture is simulated as part of the haptic feedback system 100.

As illustrated in the upper portion 302, between the locations L1 and L2, the interface surface $180_{simulated}$ has a texture in which the height decreases, even though as shown in the lower portion 300, the interface surface $180_{actual}$ is planar. In order to simulate the effect of the decreasing height, as the roller 112 moves across the interface surface 180, the haptic feedback system 100 may decrease the friction applied against the roller 112 within the stylus 108. Between the locations L2 and L3, by contrast, the interface surface $180_{simulated}$ has a texture in which the height increases, even though the interface surface $180_{actual}$ is planar. Thus, in order to simulate the effect of the increasing height, as the roller 112 moves across the interface surface 180, the haptic feedback system 100 may increase the friction applied against the roller 112 within the stylus 108. Accordingly, the haptic feedback system 100 may simulate the effect of the roller 112 traversing rough textures, or textures with bumps, lines, or grooves, etc., by increasing and decreasing the friction applied to the roller 112 within the stylus 108 as the stylus 108 moves across the interface surface 180, or as a lateral force is applied by the user on the stylus 108. According to some embodiments, the stylus 108 may include an axial actuator (e.g., the axial actuator 210 shown in FIG. 6) configured to create a haptic sensation of the stylus rising and falling as it goes over ridges. For example, the axial actuator may extend between locations L2 and L3, and contract between locations L1 and L2 in FIG. 8.

Figure 9:
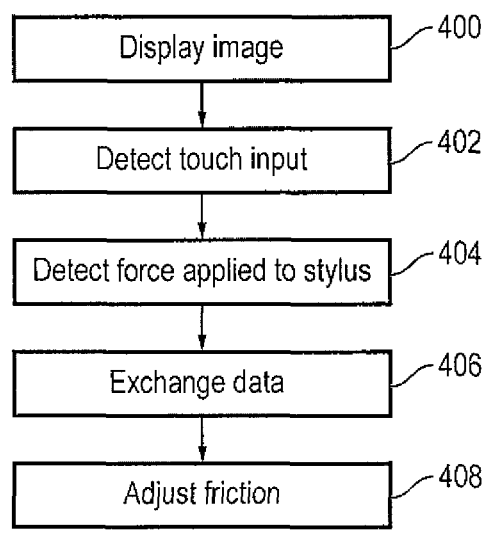
FIG. 9 is a flow diagram of a process for generating haptic feedback, according to embodiments of the present invention.

FIG. 9 is a flow diagram of a process for generating haptic feedback, according to embodiments of the present invention. According to some embodiments, at operation 400, the haptic feedback system 100 displays an image (e.g., on the display panel 106) having corresponding texture data. At operation 402, the haptic feedback system 100 detects a touch input by the stylus 108 (e.g., the roller 112 of the stylus 108) on the interface surface 180. At operation 404, the haptic feedback system 100 detects a force applied to the stylus 108 (e.g., lateral or vertical force) and/or motion by the stylus 108 against the interface surface 180. At operation 406, the haptic feedback system 100 exchanges force, touch location, orientation, and texture data between the stylus 108 and the electronic device 102. At operation 408, the haptic feedback system 100 adjusts or modulates the friction between the roller 112 and the friction modulator (e.g., by way of the friction actuator 166 applying a force against the roller 112) of the stylus 108 to modulate the friction between the roller 112 and the stylus 108 according to the measured force, touch location, orientation, and texture data.

According to some embodiments of the present invention, the sensors for detecting or measuring pressure and location may be incorporated or fully contained within the electronic device 102, and only mono-directional communication may be used such that the electronic device 102 transmits control signals to components of the friction system 134 of the stylus 108.

Embodiments of the present invention, therefore, may simulate a variety of writing surfaces based on the location of the touch point of the roller 112 relative to the texture data of displayed images. Additionally, embodiments of the present invention may simulate the effect or texture of various writing instruments on various writing surfaces, by adjusting the friction applied to the roller 112 to achieve a corresponding texture effect. Writable surfaces have small-scale texture properties that vary the amount of friction as a writing utensil traverses the writable surface, which creates a perceptible sensation to the user operating a writing utensil with a writing surface.

Embodiments of the present invention may enable simulation of various real-world writing utensils against writing surfaces by modulating or adjusting the friction of the roller 112 within the bearing. For example, if the haptic feedback system 100 is simulating a pencil writing on paper, the haptic feedback system 100 may make minor increases and decreases to the amount of friction applied to the roller 112 by the stylus 108, but at a very high frequency as the stylus moves across the interface surface 180. As another example, if the haptic feedback system 100 is simulating a ballpoint pen writing on paper, frequency of adjustments to the friction may be lower than for pencil and paper, while the magnitude of friction variations may be higher. Additionally, if the haptic feedback system 100 is simulating a marker against a white board, the haptic feedback system 100 may make very high frequency adjustments between two very low levels of friction. If the haptic feedback system 100 is simulating a pen writing on a wood surface, it may apply strong changes in friction magnitude at very low frequency, and may also include force anisotropy.

The functionality of the processors and controllers and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or the like. Further, the various components of these devices may be a process or thread, running on one or more processors, in one or more computing devices, executing computer program instructions and interacting with other system components for performing the various functionalities described herein. The computer program instructions may be stored in a memory which may be implemented in a computing device using a standard memory device, such as, for example, a random access memory (RAM). The computer program instructions may also be stored in other non-transitory computer readable media such as, for example, a flash drive, or the like. Also, a person of skill in the art should recognize that the functionality of various computing devices and electronic components may be combined or integrated into a single computing device or electronic component, or the functionality of a particular computing device or electronic component illustrated in the figures may be distributed across one or more other computing devices or electronic components without departing from the spirit and scope of the exemplary embodiments of the present invention. For example, although the processor or controller 124 is illustrated as being positioned or located within the stylus 108, a person having ordinary skill in the art should recognize that some or all of the functionality of the processor or controller 124 may be performed by a component (e.g., the processor 142) of the electronic device 102.

Although this invention has been described in certain specific embodiments, those skilled in the art will have no difficulty devising variations to the described embodiment, which in no way depart from the scope and spirit of the present invention. Furthermore, to those skilled in the various arts, the invention itself herein will suggest solutions to other tasks and adaptations for other applications. It is the applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents.

What is claimed is:

1. A stylus for a display device, the stylus comprising:
    a bearing housing;
    a roller in the bearing housing;
    a first actuator coupled to the bearing housing and configured to apply a pressure against the roller by moving a friction modulator against the roller to modulate a friction between the stylus and the roller,
    wherein the bearing housing comprises a plurality of sections configured to be moved against the roller to modulate the friction between the stylus and the roller; and
    an axial actuator coupled to the bearing housing and the first actuator and configured to adjust axial positions of the friction modulator and the plurality of sections simultaneously.

2. The stylus of claim 1, further comprising a second actuator coupled to the bearing housing and configured to apply a pressure against the roller to modulate the friction between the stylus and the roller.

3. The stylus of claim 1, wherein the first actuator is configured to apply the pressure against the roller by moving a friction modulator against the roller.

4. The stylus of claim 3, wherein the pressure is applied according to a data from the display device.

5. The stylus of claim 1, further comprising a strain gauge configured to measure a force applied to the stylus, wherein the first actuator is configured to modulate the friction between the stylus and the roller according to the force.

6. A haptic feedback system, comprising:
    a display; and
    a stylus in communication with the display, wherein the stylus comprises:
        a bearing housing;
        a roller in the bearing housing;
        a first actuator coupled to the bearing housing and configured to apply a pressure against the roller by moving a friction modulator against the roller to modulate a friction between the stylus and the roller,
        wherein the bearing housing comprises one or more sections configured to be moved against the roller to modulate the friction between the stylus and the roller; and
        an axial actuator coupled to the bearing housing and the first actuator and configured to adjust axial positions of the friction modulator and the one or more sections simultaneously.

7. The haptic feedback system of claim 6, further comprising a second actuator coupled to the bearing housing and configured to apply a pressure against the roller to modulate the friction between the stylus and the roller.

8. The haptic feedback system of claim 6, wherein the first actuator is configured to apply the pressure against the roller by moving a friction modulator against the roller.

9. The haptic feedback system of claim 8, wherein the bearing housing operates as the friction modulator.

10. The haptic feedback system of claim 6, further comprising a strain gauge configured to measure a force applied to the stylus, wherein the first actuator is configured to modulate the friction between the stylus and the roller according to the force.

11. The haptic feedback system of claim 6, further comprising a processor configured to transmit a data signal to the first actuator to modulate the friction based on texture data corresponding to an image displayed on the display and a motion of the stylus relative to the image.

12. A method of generating haptic feedback in a stylus, the stylus comprising:
    a bearing housing;
    a roller in the bearing housing;
    a first actuator coupled to the bearing housing and configured to apply a pressure against the roller by moving a friction modulator against the roller to modulate a friction between the stylus and the roller,
        wherein the bearing housing comprises one or more sections configured to be moved against the roller to modulate the friction between the stylus and the roller; and
        an axial actuator coupled to the bearing housing and the first actuator and configured to adjust axial positions of the friction modulator and the one or more sections simultaneously, the method comprising:
    detecting a touch input on a display, the touch input being applied to a touch interface by the roller of the stylus, wherein the roller is in the bearing housing;
    modulating the friction applied to the roller according to the touch input; and
    transmitting a signal to the axial actuator coupled to the bearing housing for adjusting an axial position of the bearing housing in the stylus.

13. The method of claim 12, further comprising displaying an image on the display, wherein the modulating of the friction applied to the roller is based on texture data corresponding to the image.

14. The method of claim 13, wherein the modulating of the friction applied to the roller is further based on a motion of the stylus on the touch interface relative to the image displayed on the display.

15. The method of claim 12, further comprising calculating an orientation of the stylus relative to the display and modulating the friction applied to the roller according to the orientation.

16. The method of claim 12, wherein the modulating of the friction applied to the roller comprises applying a first pressure against the roller by a first friction actuator.

17. The method of claim 16, wherein the modulating of the friction applied to the roller comprises applying a second pressure against the roller by a second friction actuator.

18. The method of claim 12, further comprising:
    displaying an image on the display; and
    adjusting a position of the roller within stylus by the axial actuator according to texture data corresponding to the image.

* * * * *

UNITED STATES PATENT AND TRADEMARK OFFICE
CERTIFICATE OF CORRECTION

| | | |
|---|---|---|
| PATENT NO. | : 9,804,692 B2 | Page 1 of 1 |
| APPLICATION NO. | : 14/659532 | |
| DATED | : October 31, 2017 | |
| INVENTOR(S) | : David M. Hoffman and Wei Xiong | |

It is certified that error appears in the above-identified patent and that said Letters Patent is hereby corrected as shown below:

On the Title Page

(60) Related U.S. Application Data delete "61/972,196" and insert -- 61/972,186 --

Signed and Sealed this
Sixteenth Day of July, 2019

Andrei Iancu
*Director of the United States Patent and Trademark Office*